June 25, 1968     CARL-ERIK GRANQVIST     3,390,348
SYSTEM FOR GENERATING A SIGNAL REPRESENTING THE TIME
DELAY OF A SIGNAL PATH Filed Feb. 17, 1967     3 Sheets-Sheet 1

INVENTOR
CARL-ERIK GRANQVIST

BY *Larson and Taylor*

ATTORNEYS

INVENTOR
CARL-ERIK GRANQVIST

BY Larson and Taylor
ATTORNEYS

United States Patent Office 3,390,348
Patented June 25, 1968

3,390,348
SYSTEM FOR GENERATING A SIGNAL REPRESENTING THE TIME DELAY OF A SIGNAL PATH
Carl-Erik Granqvist, Lidingo, Sweden, assignor to AGA Aktiebolag, Lidingo, Sweden, a corporation of Sweden
Filed Feb. 17, 1967, Ser. No. 616,919
Claims priority, application Sweden, Apr. 28, 1966, 5,814/66
12 Claims. (Cl. 331—18)

ABSTRACT OF THE DISCLOSURE

In an instrument for measuring a time delay, signals of frequencies $n\omega$ and $(n+1)\omega$ are applied to the delay path, a first marking signal is generated at coincidence on the input side, and a second marking signal representing coincidence on the output side. The time difference between the marking signals represents the delay. The first marking signal may start a pulse, which is terminated by the second marking signal, or the first signal may start a counter, which is stopped by the second signal.

---

The invention relates to the measurement of time delays, such as the delay of a signal path, and is specifically concerned with generating an output signal which is representative of the time delay of the signal path and may be used for indicating purposes or for translation to a remote point of observation. For both of these purposes it is of advantage to have a signal representative of the delay and which can be transformed into digital form as simply as possible.

It is known from U.S. patent specification 2,717,358 to translate a signal repeatedly through a signal path, the delay of which is to be measured, to obtain an output signal having a delay which is a multiple of that of the signal path. The known circuit uses pulses which are repeatedly fed to the signal path, which requires complex circuit arrangements.

It is an object of the invention to provide a simple circuit for deriving a signal which is representative of the time delay of a signal path without the necessity of translating pulses through the signal path. Another object is to obtain an output signal having a duration which is accurately proportional to the time delay. A further object is to provide a simple circuit for translating the measure of the time delay into digital form.

The principle of the invention consists in applying a first and a second frequency to the signal path and generating marking signals in response, for instance, to phase equality between the signals on the input side as well as on the output side. The time difference between the occurrence of phase equality, according to the well-known vernier principle, is proportional to the time delay of the signal path.

Figure 1:
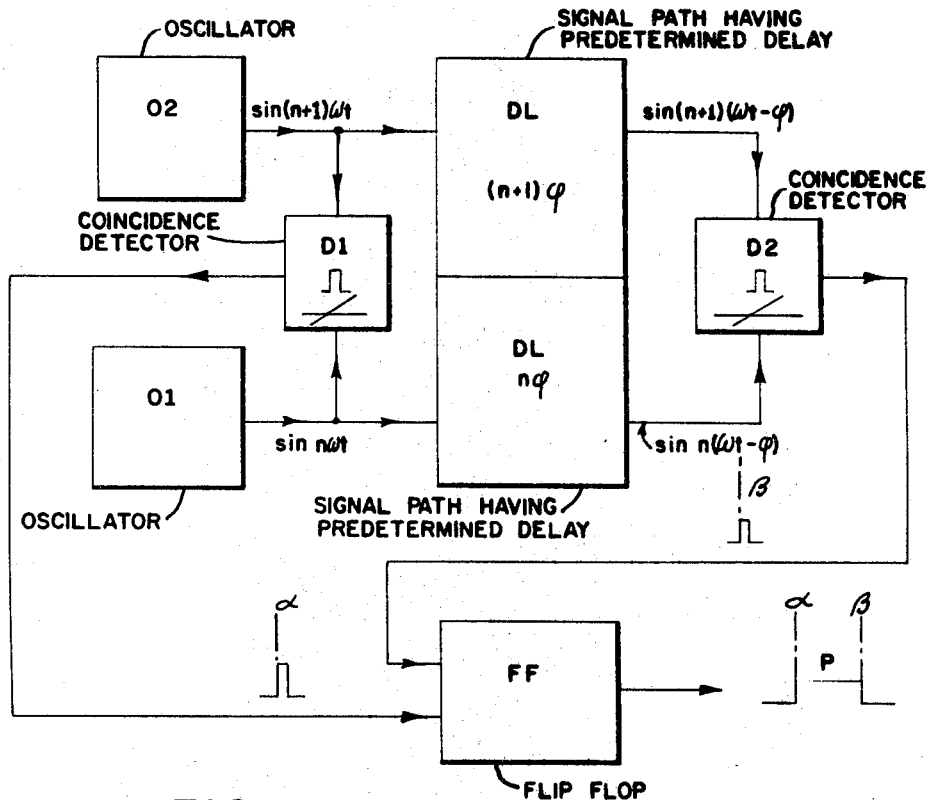
FIG. 1 shows a circuit according to the invention for generating an output signal P, the duration of which represents the delay of a signal path DL.

In FIG. 1, DL is a signal path having a predetermined time delay which is to be measured.

A pair of oscillators O1 and O2 generate signals of the form sin $n\omega t$ and sin $(n+1)\omega t$, respectively, which are applied to the signal path and appear at the output in the form of delayed signals sin $n(\omega t - \varphi)$ and sin $(n+1)(\omega t - \varphi)$, respectively. Obviously, the phase delays caused on the two frequencies are of the form $n\varphi$, and $(n+1)\varphi$, respectively, since we are concerned with a signal path having a predetermined time delay.

On the input side of the signal path there is provided a first detector D1 for generating a first marking signal in response to a predetermined phase relation between the first and second signals, specifically, in response to a simultaneous zero passage in the positive direction of the two signals. The detector D1 may be any well known type of coincidence detector. The first marking signal $\alpha$ obtained from detector D1 is applied to a flip flop circuit FF and initiates the generation of an output pulse P, the leading flank of which will thus be coincident in time with $\alpha$.

On the output side of the signal path DL there is provided a similar detector D2, to which are applied the first and the second signal after translation thereof through the signal path. Detector D2 generates a second marking signal $\beta$, which is also applied to flipflop circuit FF and terminates the pulse P generated thereby. The trailing flank of P will thus be coincident in time with $\beta$.

Figure 2:
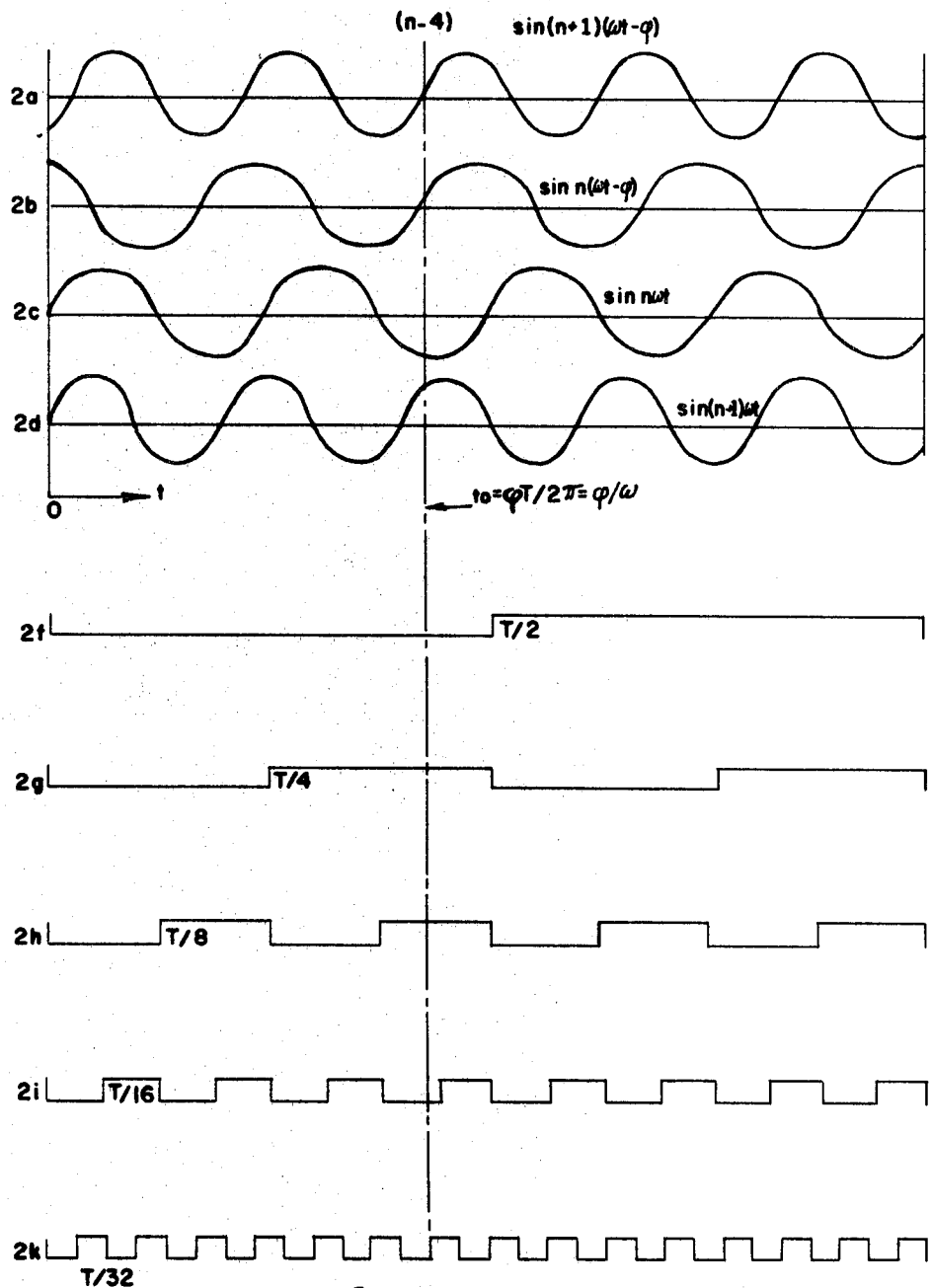
FIG. 2 shows curves illustrating the operating principle of the circuits of FIG. 1 and FIG. 3.

It is obviously possible to use other frequency values than $n\omega t$ and $(n+t)\omega t$, however, the values chosen are particularly suitable for a vernier type of operation, as will be apparent from a consideration of FIG. 2.

In FIG. 2 it has been assumed, for simplicity, that $n$ has the value 4. The curves $2a \ldots d$ illustrate input and output signals of DL referred to above and the equations of which are indicated at the corresponding curves. As is apparent from curves $2a$ and $2b$ there is a simultaneous zero passage in the positive direction at the time value $$t = \frac{\varphi}{\omega} = \frac{\varphi T}{2\pi} \quad (1)$$

where $T$ is the period corresponding to the angular frequency $\omega$. The value of $t$ obtained from Equation 1 is thus also the duration of the pulse P of FIG. 1.

FIG. 2 also illustrates the manner in which a digital measure may be generated, which lends itself easily to such arithmetical operations as addition, subtraction, etc., FIGURES $2f \ldots k$ show pulses which may be obtained successively from each other by multiplication or division. In FIG. $2f$, the pulses are of frequency $\omega$, corresponding to the period $T$, in FIG. $2g$, of frequency $2\omega$, etc. At the bottom of the figure, it is shown how the digital measure corresponding to the value $t_0$ may be obtained in binary form simply by indicating the presence or the absence (corresponding to binary digit 1 and 0, respectively) at time $t_0$ of the various pulses of the curves $2f \ldots k$. Thus, the presence of a pulse from curve $2f$ at time $t_0$ would show that the time value of $T/2$ has been reached. There is no pulse present of this frequency, and the corresponding binary digit is therefore a 0. Curve $2g$ shows the presence of a pulse of frequency $2\omega$, indicating that the value of $T/4$ has been surpassed. Correspondingly, there is a binary digit corresponding to the value $T/4$. The value obtained in this manner is, as shown in the figure, $13T/32$.

FIG. 3

Figure 3:
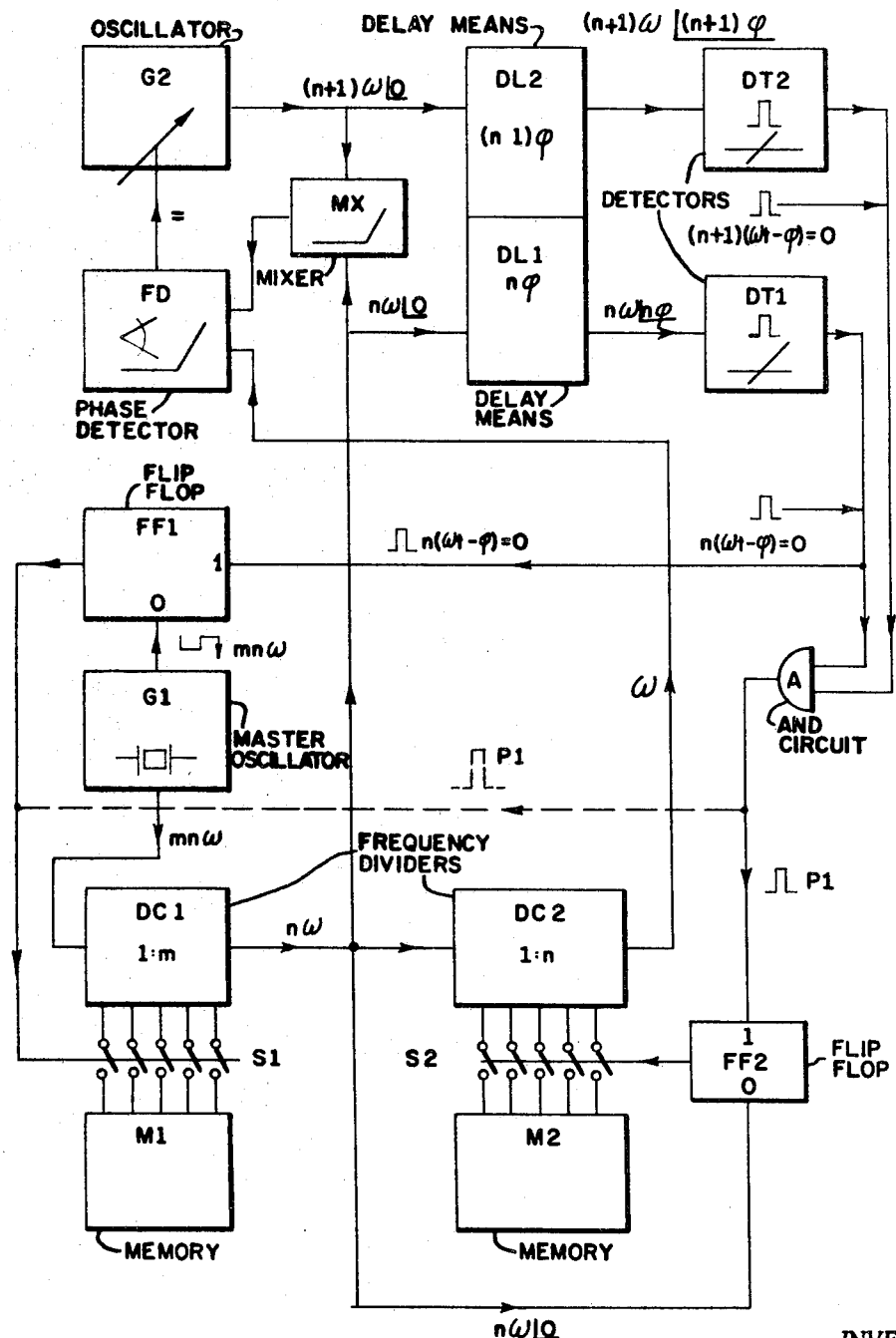
FIG. 3 is a circuit for generating and indicating a digital measure of a time delay.

FIG. 3 shows an arrangement for measuring a distance by means of two frequencies $n\omega$ and $(n+1)\omega$, which are both translated over the distance, the latter being represented as a delay means DL1 for the first frequency $n\omega$ and as a second delay means DL2 for the second frequency $(n+1)\omega$. The corresponding phase delays then are $n\varphi$ and $(n+1)\varphi$, respectively.

The operation of the instrument is controlled by a precision master oscillator G1, such as a crystal oscillator, which generates an oscillation of frequency $mn\omega$. This frequency is divided in a first frequency divider DC1 by the factor $m$, yielding the output frequency $n\omega$. This frequency is translated to a second frequency divider DC2 having a division factor of $n$ and yielding the output frequency $\omega$. The frequency $n\omega$ is applied to a mixer MX, to which is also applied the output signal $(n+1)\omega$ of a second oscillator G2. The frequency and phase of oscillator G2 in controlled by a phase control means in the form of a phase detector FD. Detector FD has applied to it the output signal of frequency $\omega$ from the mixer MX as well as the phase reference signal, also of frequency $\omega$, from DC2 and compares these two signals with each other to generate in kell-known manner a control signal, which is applied to oscillator G2 and controls the phase and frequency thereof.

The output signal from the delay means DL1 is applied to a first detector DT1 which generates an output signal in response to a positive zero passage of the applied signal. The output of delay means DL2 is applied to a corresponding detector DT2 generating a corresponding output signal in response to the positive zero passage. The output signals of the detectors are applied to an AND circuit A, which in well-known manner supplies an output pulse when pulses are simultaneously applied to its two input circuits.

The output of master oscillator G1 is applied to a first activating circuit in the form of a flipflop FF1 having an inhibiting input circuit 0 which responds to the negative-going flank of the output signal from oscillator G1. The flipflop FF1 also has an activating input circuit 1, which responds to the output signal from DT1.

The units DC1 and DC2 are constructed as counting circuits. For instance, each of these frequency dividers may comprise a series of stages for dividing by 2, each stage having a 0 and a 1 condition, so that the 0 or 1 condition of the counting stages serve as an indication of the number of pulses of frequency $mn\omega$ that has been applied after the positive zero passage of the output signal of frequency $n\omega$. An indicator in the form of a memory M1 can be connected to divider DC1 by way of a switch S1 which is controlled by the output pulse from FF1.

The second frequency divider DC2 is of similar construction and can be connected via a switch S2 to a memory M2 in response to the output pulse from activating circuit FF2.

Figure 4:
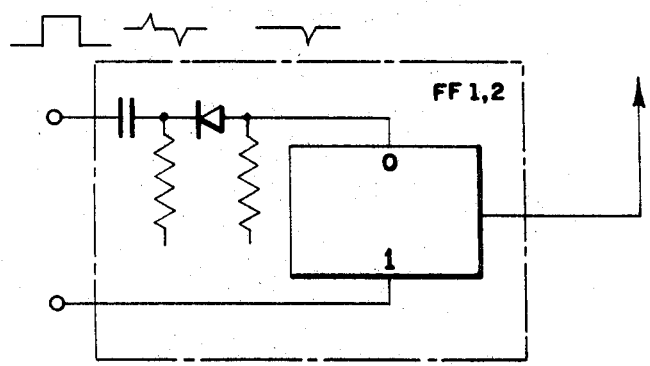
FIG. 4 shows an embodiment of the units FF1 and 2 used in FIG. 3.

FIG. 4 shows an embodiment of units FF1 and 2, which are inhibited by a negative-going flank of the input signal. The latter is first differentiated in a condenser-resistor combination in well-known manner, which gives rise to a positive and a negative "spike." The following stage is a rectifier-resistor combination which lets through only the negative spike to the 0 input.

In the FIG. 3 circuit, wave-shaping and phase-control units may be required at various points. For instance, a transition from rectangular to sinusoidal waves or vice versa may be required. For the sake of clarity and to facilitate the understanding of the operation, these modifying circuits have been omitted. As an example, the input signal to FF1 from G1 has been indicated as being a square wave, although master oscillator G1 is a sine-wave oscillator. It is well-known that a sinusoidal wave may be transformed to square shape by passing it through a plurality of amplifying and limiting stages. Similarly, the input signal to DL1 should preferably be sinusoidal, whereas the output from DC1 may be of a substantially rectangular shape if DC1 contains counting stages of the flipflop or multivibrator type. It is also well-known that a square wave may be transformed to sinusoidal shape by passing it through filter circuits.

OPERATION OF FIG. 3 CIRCUIT

In the course of a period of the frequency $n\omega$, there are supplied from G1 a number $m$ of output pulses, which are counted by DC1.

In DL1 there is produced a delay corresponding to a phase angle $n\varphi$ and there is obtained from DT1 an output pulse. This pulse activates FF1 and causes it to supply a pulse to S1. The memory M1 now reads off and indicates the value that has been counted into DC1 and which corresponds to the phase angle $n\varphi$, one period (360°) corresponding to the digital number $m$. Owing to the inhibition caused by the negative-going flank of $mn\omega$ when supplied to the 0 input of FF1, S1 is prevented from closing while the counting process is going on in DC1.

The indication obtained at M1 shows how large a part of the period of $n\omega$ that corresponds to the unknown delay. It may be required to add an unknown number of whole periods of $n\omega$ in order to obtain the correct value of the delay. The determination of this unknown number of whole periods is performed by the second frequency divider DC2 with its associated memory M2.

As is apparent from the curves $2a$ and $b$, there is present initially on the output side of DL1 and 2 a phase difference $(\varphi)$ between the signals. Owing to the frequency difference, this phase difference decreases with time, and finally, at time $t_0$, phase equality is reestablished. It is easy to see that this simultaneous use of two different frequencies is equivalent to a periodic operation at a frequency equal to the difference between the two frequencies, i.e. the frequency of the resulting operation is $\omega$ and there it obtained in this manner a value of $t_0 = \varphi/\omega$ at the time of the simultaneous zero passage.

At time $t_0$, there is supplied from and-circuit A an output pulse P1 which activates FF2. Activation of FF2 causes a closing of switch S2 and memory M2 then reads off the value that has been counted into counter DC2. This counter also may consist of a number of successive stages for dividing by 2. As is apparent from FIG. 3, counter DC2 counts the oscillations supplied from DC1.

Obviously, memory M1 could also respond to P1, since this pulse is simultaneous with certain output pulses from FF1. This modification has been indicated in FIG. 3 by a dash-line connecting the output of A to the switch S1. If this connection is made, activating circuit FF1 can be dispensed with.

What is claimed is:

1. Circuit arrangement for generating an output signal representing the delay of a signal path having a predetermined time delay, characterized by
    a first oscillator coupled to the signal path and adapted to generate and apply thereto a first signal having a first frequency,
    a second oscillator coupled to the signal path and adapted to generate and apply thereto a second signal having a second frequency,
    a first detector responsive to a predetermined phase relation between said first and second signals as applied to said signal path for generating a first marking signal,
    a second detector responsible to said predetermined phase relation betwene said first and second signals after translation thereof through said signal path for generating a second marking signal, and
    a signal generator responsive to said first and second marking signals for generating an output signal representative of the time difference therebetween.

2. Circuit arrangement as claimed in claim 1, characterized in that the first and the second oscillator have operating frequencies $n\omega$ and $(n+1)\omega$, respectively, where $n$ is an integer.

3. Circuit arrangement as claimed in claim 1, characterized in that the signal generator is a pulse generator adapted to supply an output pulse and to initiate generation of said output pulse in response to the first marking signal and to terminate the same in response to the second marking signal.

4. Circuit arrangement as claimed in claim 1, characterized in that the first oscillator comprises a master oscillator adapted to produce a pulse sequence of high frequency and a phase-locking means for locking the phase of said pulse sequence to that of said first signal.

5. Circuit arrangement as claimed in claim 4, characterized in that said phase locking means comprises a frequency divider to which said pulse sequence is applied and the divided-down output signal of which forms said first signal.

6. Circuit arrangement as claimed in claim 4, characterized by a phase control means adapted to lock the phase of the second oscillator to that of said first signal.

7. Circuit arrangement as claimed in claim 6, characterized in that said phase control means comprises a phase detector having an input connected to the output of a mixer to which said first and second signals are supplied, whereby the output of said mixer is of a frequency equal to the difference between said first frequency and said second frequency and having a second input connected to a phase reference source.

8. Circuit arrangement as claimed in claim 5, characterized in that the frequency divider comprises a counter to which said pulse sequence is supplied.

9. Circuit arrangement as claimed in claim 8, characterized by an activating circuit and by a switch responsive to said activating circuit to connect to the counter an indicator, said activating circuit being responsive to the delayed output signal of said first frequency obtained from said signal path.

10. Circuit arrangement as claimed in claim 1, characterized by a second frequency divider the input circuit of which is connected to the output of said first divider and the output signal of which is a subfrequency of said first frequency.

11. Circuit arrangement as claimed in claim 10, characterized in that said second frequency divider is a counter and by an indicator connected to said counter and adapted to indicate the position of said counter in response to the output signal of said second detector.

12. Circuit arrangement as claimed in claim 4, characterized by a frequency divider, the input circuit of which is connected to the output circuit of said master oscillator and the output signal of which forms said first frequency.

References Cited

UNITED STATES PATENTS

| 3,140,488 | 7/1964 | Girault | 343—12 |
| 3,168,735 | 2/1965 | Cartwright | 343—12 |
| 3,302,161 | 1/1967 | Ellison | 343—13 |

ROY LAKE, *Primary Examiner.*

S. H. GRIMM, *Assistant Examiner.*